JOHN HOWARTH.
Improvement in Apparatus for Evaporating Liquids.
No. 114,295.                      Patented May 2, 1871.
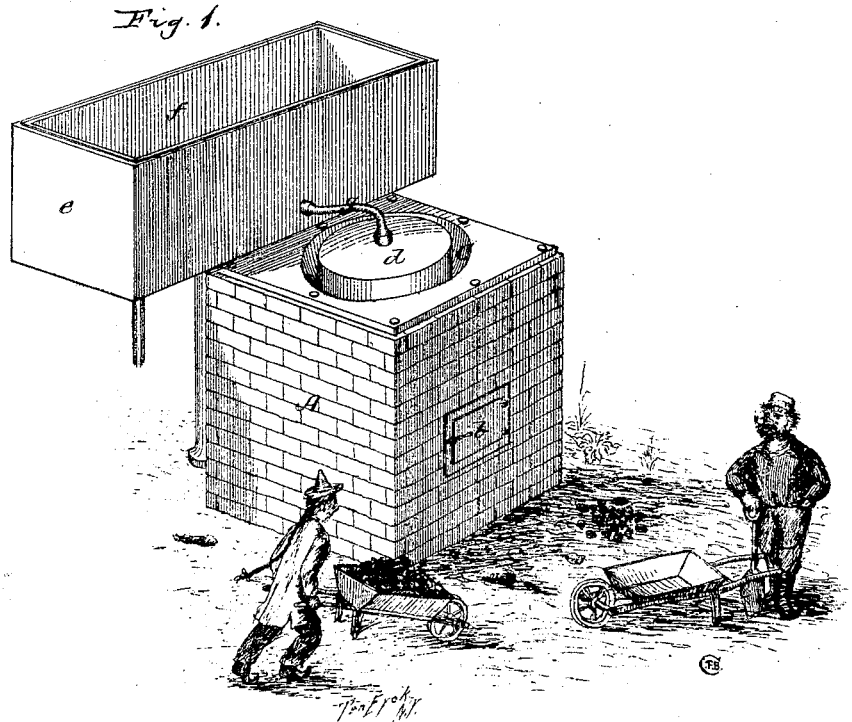
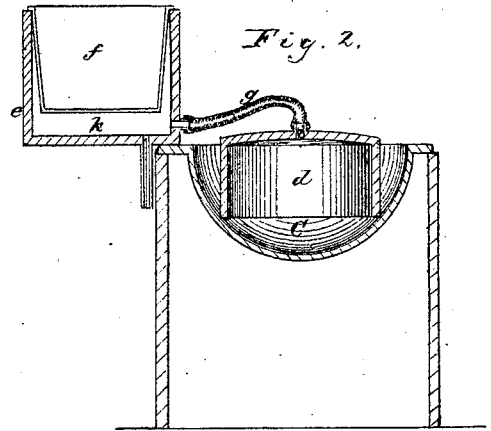
Witnesses.
Charles F. Brown,
H. P. Wright
Inventor.
John Howarth
by Carroll D. Wright
atty.

UNITED STATES PATENT OFFICE.

JOHN HOWARTH, OF SALEM, MASSACHUSETTS.

IMPROVEMENT IN APPARATUS FOR EVAPORATING LIQUIDS.

Specification forming part of Letters Patent No. 114,295, dated May 2, 1871; antedated April 15, 1871.

I, JOHN HOWARTH, of Salem, in the county of Essex and State of Massachusetts, have invented certain Improvements in Apparatus for Evaporating Liquids, of which the following is a specification:

Figure 1 is a perspective view of my invention, and Fig. 2 a sectional elevation of the same.

This invention relates to the process of free evaporation (as distinguished from evaporation under pressure or *in vacuo*) in the concentration of liquids for the manufacture of salt, alum, sulphate of iron, copper, and other combinations in solution for crystallization, as ammonia, dye-wood, liquors, &c. These solutions are usually passed into the evaporating vessel or kettle in a cold state; and the object of my invention is to utilize the steam escaping from said kettle during the process of evaporation for the heating of said cold solutions nearly to the boiling-point before passing the same into the evaporating-kettle.

In the drawing, A represents the brick-work, containing the kettle C, and the furnace, having the door *b*. *d* represents a vessel of any suitable material, open at one end, like a bell-glass, inverted as a cover and placed within the kettle C, so that its lower edge or flange shall reach the lowest point which the solution to be evaporated is likely to reach in course of evaporation, the liquid thus serving at all times as a water-lute, and insuring the collection within the vessel *d* of all the steam generated in its limits.

I represents an aperture in the top of vessel *d*, which aperture is connected by the flexible tube *g* with the space *k* in casing *e* under tank *f*.

It will be seen that the steam generated within the vessel *d* must pass off through orifice *i* and tube *g* into space *k*, which nearly surrounds tank *f*, this latter containing a supply of the solution to be evaporated, which is heated by the steam from vessel *d*, and is ready to be drawn hot, by a siphon or otherwise, into the kettle C whenever the solution therein contained is sufficiently concentrated to be drawn off, thus securing economy of fuel and facilitating the process.

When the material is sufficiently concentrated and ready to be removed from the kettle C, the tube *g* can be disconnected by removing the nipple from the aperture in the cover *d* and the latter lifted from the kettle, leaving its contents wholly accessible. After removing the concentrated material the kettle is again replenished with heated liquid from the reservoir *f*, and the cover being replaced the process continues as before.

The cover *d*, instead of being of the form shown and plunged inverted into the liquid, may be made to fit to the edges of the pan or boiler, and luted with clay or other suitable material; but I prefer the form substantially as above described.

Having thus fully described my invention, what I claim as new, and desire to secure by Letters Patent, is—

1. The cover *d*, communicating with space *k* by flexible pipe or tube *g*, and operating substantially as and for the purpose described.

2. The cover *d*, having tube *g*, in combination with space *k* and kettle C, substantially as described.

In testimony whereof I have hereunto signed my name to this specification in the presence of two subscribing witnesses.

JOHN HOWARTH.

Witnesses:
  IDA E. WRIGHT,
  CHARLES F. BROWN.